United States Patent [19]
Johns et al.

[11] 3,778,763
[45] Dec. 11, 1973

[54] TURN ACTUATED ALARM SYSTEM FOR AUTOMOTIVE VEHICLES

[75] Inventors: Raymond Johns; David C. Kuhns, both of Canton, Ohio

[73] Assignee: Safety Research and Development Inc., Canton, Ohio

[22] Filed: May 18, 1971

[21] Appl. No.: 144,482

[52] U.S. Cl............. 340/55, 200/61.47, 200/61.52, 340/67, 340/75, 340/81 R
[51] Int. Cl........................... B60q 5/00, B60q 1/38
[58] Field of Search.................... 340/52, 52 H, 66, 340/67, 73, 75, 78, 262

[56] References Cited
UNITED STATES PATENTS

| | | | |
|---|---|---|---|
| 2,562,567 | 7/1951 | Moledzky | 340/52 H X |
| 3,309,562 | 3/1967 | Schultz | 340/81 R |
| 2,823,367 | 2/1958 | Huron | 340/52 H |
| 3,478,312 | 11/1969 | Lee | 340/67 |
| 3,581,278 | 5/1971 | Huffman | 340/71 X |

FOREIGN PATENTS OR APPLICATIONS

| | | | |
|---|---|---|---|
| 592,929 | 5/1925 | France | 340/73 |
| 401,545 | 5/1966 | Switzerland | 340/52 H |
| 1,808,590 | 6/1970 | Germany | 340/61 |

*Primary Examiner*—Kenneth N. Leimer
*Attorney*—Meyer, Tilberry & Body

[57] ABSTRACT

A centrifugally and/or tilt-actuated switch is provided on an automobile which is actuated when a vehicle travels around a curve at a speed in excess of the safe speed on the curve to operate an alarm and alert the driver that he is moving at an excessive rate of speed for that curve. The conventional turn signal mechanism on the automobile when actuated deactivates the alarm so that the alarm will not operate when the automobile is going around a sharp corner in a city and will remain deactivated until the car has returned to normal operation. If the turn indicator is not actuated prior to turning a corner, the alarm will sound to advise the driver that he has not properly actuated the turn signals.

2 Claims, 3 Drawing Figures

PATENTED DEC 11 1973

3,778,763

INVENTORS.
RAYMOND JOHNS
& DAVID C. KUHNS
BY
Meyer, Tillerry & Body
ATTORNEYS.

TURN ACTUATED ALARM SYSTEM FOR AUTOMOTIVE VEHICLES

This invention pertains to the art of automobile or truck operation and more particularly to safety mechanisms for such vehicles to sound an alarm when it is operated in an unsafe manner.

The invention is particularly applicable to sounding an alarm when an automobile or truck attempts to round a corner or curve at a speed in excess of the safe speed for the curve and will be described with particular reference thereto although it will be appreciated that the invention has other and broader applications, for example, to turn the motor off if the vehicle should overturn and thus decrease the fire hazard.

With the advent of the high speed highways and with automobiles which have a low interior sound level, the operators of the vehicles tend to drive such vehicles at higher and higher speeds without actually being aware of such high speeds. The problem becomes particularly evident where the driver is leaving a high speed highway by means of one of the exit roads which have a gradually decreasing radius of curvature. Here the driver will often approach the curve at an excessive speed. As the radius of curvature decreases, before the driver is aware of it, the centrifugal forces on the vehicle are such as to make it possible for the driver to lose control. The same situation exists on normal highways where the driver comes into the curve at speeds in excess of that which are normally safe on such curve, but is unaware of such excessive speed until it is too late to take defensive action by slowing down.

Assuming dry and relatively smooth road surfaces, there is a maximum speed at which any curve of a road can be safely driven. At speeds beyond this maximum speed, the driver is in danger of losing control of the car. This maximum speed is a function of the radius of curvature of the curve and of the slope or banking of the road surface either in a positive direction towards the center of curvature or in a negative direction away from the center of curvature. Experiments by safety authorities have determined that the maximum speed is that at which conventional or standard turn bank indicators read ten to fourteen degrees. In excess of this reading, the vehicle is traveling at an excessive rate of speed and the operator is in danger of losing control.

The present invention contemplates an arrangement for sensing the over-speed of a vehicle in a turn and alerting the driver to such over-speed.

Another difficulty with the operation of motor vehicles has been that the operator fails to use, in accordance with the requirements of the law, the turn signals provided on the vehicle, often resulting in damage to other vehicles. The present invention contemplates an arrangement which will sense a vehicle making a turn from its normal straightforward course and will alert the driver to the fact that he has not properly utilized his turn signals.

A potential problem with sensing of the excessive speed around a turn could be that if the driver has actuated his turn signal prior to entering a turn such as to deactivate the alarm system, as the wheels are straightened out, the turn signal would turn off, thus activating the alarm if the vehicle is traveling too fast. This tends to annoy the driver. The present invention contemplates an arrangement whereby the alarm system will remain off during this situation.

In accordance with the present invention, there is provided in combination with a motor vehicle, means for sensing an excessive speed around a curve of a road, an alarm system actuated by the sensing means for alerting the driver to excessive speed and means for deactivating the alarm system when the turn signals of the vehicle have been actuated.

Further, in accordance with the invention, additional means are provided for maintaining the alarm system deactivated when the turn signals are turned off as the wheels of the vehicle are straightened as the driver comes out of a turn.

Further, in accordance with the invention the sensing means may further be provided with means for switching off the ignition of the motor vehicle when the vehicle is excessively tilted so as to prevent fires in the event that the vehicle should overturn.

The principal object of the invention is the provision of a new and improved arrangement for motor vehicles which automatically senses excessive speed of the vehicle around turns and alerts the driver to such fact.

Another object of the invention is the provision of a new and improved arrangement which will automatically alert the driver to the fact that he has not properly operated his turn signal.

Another object of the invention is the provision of a new and improved arrangement whereby the turn signals or other external warning devices of a vehicle may be automatically operated as the driver suddenly alters course or makes a turn so as to alert oncoming and following traffic to take defensive action.

Another object of the invention is the provision of a new and improved arrangement for turning off the ignition of a motor vehicle whenever the vehicle is at an excessive angle of tilt such that will overturn.

Still a further object of the invention is the provision of an automatic arrangement for alerting the driver of a motor vehicle to the fact that he is operating the vehicle in an unsafe manner.

The invention may take physical form in certain parts and arrangement of parts, a preferred embodiment of which will be described in detail in this specification and illustrated in the accompanying drawings which form a part hereof and wherein.

Figure 1:
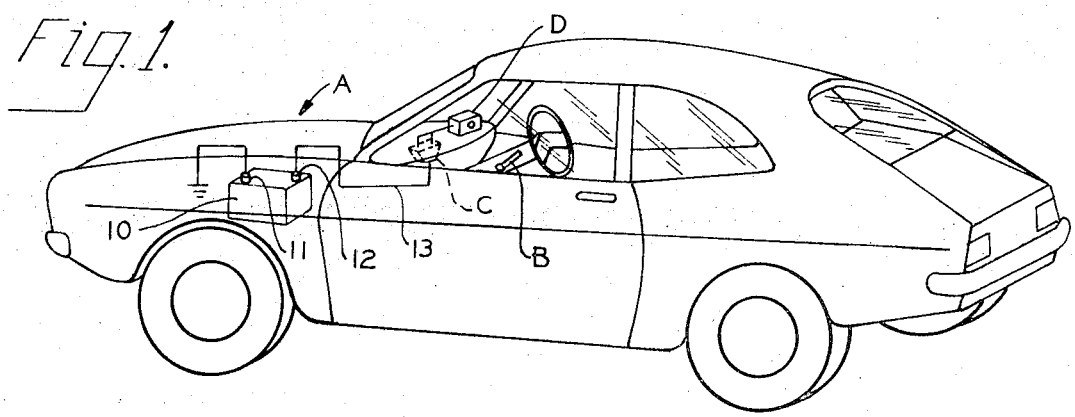
FIG. 1 shows somewhat schematically an automotive vehicle having a preferred embodiment of the invention installed therein.

Referring now to the drawings wherein the showings are for the purposes of illustrating a preferred embodiment of the invention only and not for the purposes of limiting same, FIG. 1 shows, somewhat schematically, a conventional motor vehicle A having a turn signal actuator B mounted on the steering column and in accordance with the invention a turn bank sensor C arranged to actuate either a visual or audible alarm D positioned in the driver compartment of the vehicle A.

Motor vehicle A may be any conventional motor vehicle, either a truck, passenger vehicle or otherwise. Such vehicle normally includes a DC power source such as a 12 volt storage battery 10, one terminal 11 of which is connected to the frame of the motor vehicle or ground in the wiring diagram of FIG. 2. The other terminal 12 is arranged to be connected from bus 13 to the turn signal lights RF,LF,RR, and LR and to the alarm D through suitable switching to be described.

The turn signal actuator B, as is conventional, is mounted on the steering column and includes a double acting switch E, the contacts of which are normally open. This switch, as is conventional, when actuated energizes either the right or left hand turn signals of the vehicle through a blinker switch F. The turn signal actuator B usually includes latching means (not shown) for holding it in either actuated position and other means (not shown) for returning it to the neutral position when the steering wheel is rotated in a direction opposite to that which the turn signal has previously been actuated.

The blinker switch F may take any one of a number of different forms, but in the embodiment shown includes an output terminal 20 and an input terminal 21. The blinder switch internally includes normally closed contacts 24, 25 which connect terminals 20 and 21 through a bimetallic strip 26, which when it has a current flowing therethrough, heats and opens contacts 24, 25. Contact 24 is a physical part of the bimetallic strip 26, therefore contact 26 will be referred to as the moveable contact. Contact 25 is a fixed or non-moving contact, therefore contact 25 will be referred to as the stationary contact. As stated, current flowing through bimetallic strip 26, causes the bimetallic strip 26 to bend slightly. This action takes place after current has been flowing through the bimetallic strip 26 for approximately 1 second. As bimetallic strip 26 bends, moveable contact 24 moves away from stationary contact 25 and current stops flowing. At this moment in time, bimetallic strip 26 starts to cool down and after approximately 1 second it has sufficiently cooled and it now moves back to its original position thus allowing moveable contact 24 to again close with stationary contact 25.

The turn signal switch E may be called a four-pole double throw switch and includes seven contacts 30, 31, 32, 33, 34, 35 and 36, of which contacts 31, 32 and 33, 34 are normally closed. When the turn signal lever B is actuated in one direction, e.g., for a right turn, contacts 30, 32 and 35 are closed. When turn signal lever B is actuated for a left turn, contacts 30, 33 and 36 are closed. Contacts 31 and 34 are strapped together by wire 37 which is connected to stop light switch contacts 101 through wire 38.

The four warning signal lights RF, LF, RR and LR are mounted respectively on the right and left front and right and left rear of the vehicle.

Terminal 20 of blinker switch F is connected to bus 13 through battery 10. Terminal 21 of blinker switch F is connected to contact 30 of turn signal switch E through wire 41. Contacts 32, 35, 36, 33 of turn signal switch E are connected respectively to warning lights RR, RF, LF, and LR through wires 52, 50, 51 and 53. The other terminal of the warning signal lights are connected to ground through wire 55.

The stop light switch G is included in the diagram to show how the RR and LR lights are operated and that the alarm circuit in no way affects the operation of the stop lights RR, LR and that in no way is the alarm circuit effected by the operation of the brake lights RR, LR. Stop light switch G has one set of normally open contacts 101, which close when pressure is applied to brake pedal (not shown). One side of the stop light switch G is connected to the battery 10, supply and the other side of the stop light switch G, is connected to contacts 31, 34 of turn signal switch E through wires 37 and 38.

When the turn signal switch E is actuated in one direction, contacts 30, 32, and 35 are closed and the blinker lights, RF, RR, are alternately energized through contacts 24, 25 of the blinker switch F. Thus, when the turn indicator has been actuated there is a pulsating DC voltage on wire 41 which varies from 0 to the voltage of the battery 10 which is normally 12 volts.

The above-described circuit for the warning signal lights is relatively conventional and obviously may take a number of different forms. The principal thing is that the blinker system is energized at least periodically when the turn indicator switch has been actuated in either direction.

In accordance with the invention, there is provided in combination with a turn indicator system of the general type above-described, an arrangement whereby if the vehicle turns a corner without the turn signal actuator having been operated, an alarm will sound indicating to the driver that, in the case of operating on city streets, he is operating the vehicle improperly by failing to operate his turn signal actuator before going around a corner. Also, if the operator is traveling at high speeds on a straight highway and abruptly changes lanes without first operating his turn signal indicator as safe operation requires, the alarm will sound. Further, the arrangement is such that if the vehicle commences to go around a curve at a speed in excess of the safe speed of the curve, the alarm will sound to advise the operator that he is traveling at an excessive rate of speed for the particular curve involved.

Thus, in accordance with the invention the turn sensor C is mounted on the vehicle at some convenient location and is so arranged as to be insensitive to fore and aft accelerations or decelerations but sensitive to either a sidewise tilting of the vehicle body and/or to sideward centrifugal forces on the vehicle body caused by the vehicle moving on a curve.

The turn sensor C may take a number of different forms, but in the embodiment shown, is a centrifugal-tilt switch having two pairs of normally open contacts 60, 61 arranged to close when the combined centrifugal-tilt action on the vehicle body to the right or left respectively exceeds a predetermined amount which predetermined amount may be determined by tests for the particular vehicle involved or may be that prescribed by engineers as that considered to be the safe value for any vehicle on any curve. For modern conventional automobiles and using conventional turn bank indicators, this predetermined maximum amount has been determined to be 10° – 14°. Other indicators may have a different scale or different units of measure. The maximum amount regardless of the scale or units used will be referred to hereinafter as the "maximum speed-curve" value. As will appear, the closing of contacts 60, 61 will normally energize alarm D.

The turn sensor C also includes contacts 62, 63 which are arranged to open and close at a speed-curve value substantially less than the maximum speed-curve value, e.g., 1° – 3°. As will appear, the closing of contacts 62 or 63 performs in the arrangement of the present invention by preventing activation of the alarm D if the turn signal actuator B has been operated and is returned automatically to the neutral or off position as the wheels are straightened out from the sharp turn position.

Turn bank sensor C may take a number of different forms, but in the embodiment shown, is comprised of a body of plastic 70 having two passages 71, 72 diverging from a horizontal passage 73 upwardly to the upper surface 74 of body 70. Contact members 76, 77 extend into the upper end of passages 71, 72 respectively and are held therein by means of insulating sleeves 78, 79 which have a tight sealing fit. Additionally, contact members 81, 82 extend through the sleeves 78, 79 to a point below or slightly beyond the lower end of contact members 76, 77. A passageway 80 interconnects the upper ends of passages 71, 72. Passages 71, 72 are partially filled with mercury 84 to a level such that when the lower ends of contact members 81, 82 are in a horizontal plane, the upper surface 85 of the mercury 84 will be approximately one-eighth inch below the lower end thereof. It is to be noted that the upper surface 85 and the lower ends of contact members 76, 77 form contacts 60, 61 while the lower ends of contact members 81, 82 form contacts 62, 63.

A screw 86 threaded in the wall of body 70 extends into the horizontal passage 73 and makes electrical contact with the mercury 84.

The spacing of the lower ends of contact members 76, 77, 81, 82 from the upper surface 85 of mercury 84 is such that when the turn sensor C is tilted and/or subjected to centrifugal forces equal to the maximum speed-curve value, the mercury surface 85 will have already contacted one of the contact members 81, 82 and will just come into contact with the lower end of one of contact members 76, 77 thus completing an electrical circuit from the mercury 84 to one of these contact members. The spacing of the lower end of the contact members 81, 82 from the upper surface of the mercury 85 is such that the surface 85 will break contact with the lower end of these members at a speed-curve value of approximately 1° – 3°. Obviously, this value may vary so long as it is less than the maximum speed-curve value. Obviously, if the tilt or centrifugal force is to the left, then only the contact member 76, 81 will be engaged by the mercury and when the tilt or centrifugal force or both is to the right, only the members 77, 82 will be engaged by the mercury.

In the embodiments shown, contact members 76, 77 which as before indicated form contact 60, 61 are connected to a common output terminal 90 while contact members 81, 82 which form contacts 62, 63 are connected to a common output terminal 91. Screw 86 is connected to input terminal 92.

The alarm D may take any one of a number of different forms such as a bell, buzzer, or the like, or may be a visual member such as a light, either steady or flashing, or a mechanical member which moves in the vision of the driver or any combination thereof. The alarm D may also have means for actuating the brakes of the vehicle, turning off the ignition or otherwise providing automatic control in certain instances.

The alarm D is connected between terminal 90 and the battery through normally closed contact R2 of a Relay R. Relay R includes an energizing coil RC having terminal 93 connected to battery and the other terminal 94 connected both to terminal 91 through normally open contact R1 of the relay R and to wire 41 through diode 96 so polarized that when a ground appears on wire 41 through the turn signal switch current flows through the diode and energizes Relay R.

Figure 2:
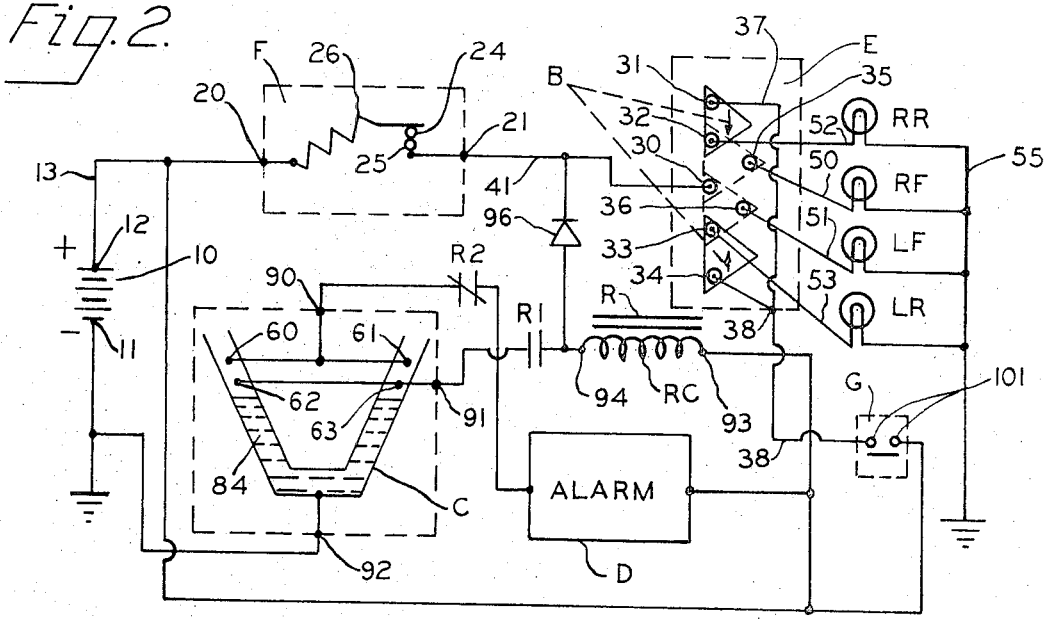
FIG. 2 is a somewhat simplified line diagram of the turn signal indicators on an automotive vehicle in combination with a preferred embodiment of the present invention.
Figure 3:
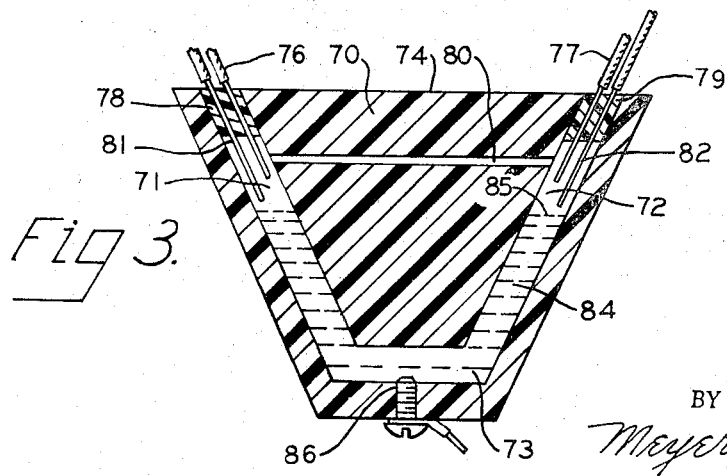
FIG. 3 is a cross sectional view of a turn bank sensor illustrating a preferred embodiment of the invention.

In operation when the vehicle is proceeding normally on a highway the various contacts of switches are in the position shown in FIG. 2. If the vehicle is braked or accelerated, nothing happens. However, if the vehicle commences to go around a corner, (e.g. to the right) mercury 84 moves to contact 62 of the sensor C. However, nothing happens because contacts R1 are open. However, when the speed exceeds the maximum safe value, mercury 84 engages contact 60 which energizes alarm D through the normally closed contacts R2 warning the driver that his speed is excessive for such a turn.

If the driver is aware that he is approaching a sharp curve and actuates his turn signals by closing either contacts 30, 32, 35 or contacts 30, 33, 36, the appropriate signal lamps RF, RR or LF, LR are energized causing a current to flow through the blinker switch which causes contacts 24–25 to open. When contacts 24, 25 are open, ground appears on wire 41 which energizes the coil of relay R and contacts R2 open either stopping the alarm from sounding or preventing it from sounding if contact 60 should close and at the same time contacts R1 close providing a holding circuit for the relay through contact 62. Relay R thus remains energized even though straightening of the wheels of the vehicle releases the turn actuator switch. The alarm remains deactivated until the vehicle reaches a speed well below the maximum safe speed which would have actuated and closed contact 60 and generally until the vehicle is either stopped or is again proceeding in a straight direction. At this point, contact 62 opens and relay R is de-energized, opening its holding contact R1 and closing contact R2. Thereafter, the circuit is ready to again operate.

Obviously, other arrangements can be provided for actuating an energized relay R when the turn signal switch is actuated; the circuit arrangement showing having proven satisfactory.

It will thus be seen that if the vehicle is in a city and the operator fails to operate his turn signals prior to rounding a corner the alarm will sound advising the operator that he is improperly operating his vehicle. Such repeated reminders serve to establish good driving habits and the proper use of the turn signaling device. On the other hand, if the operator properly actuates his turn signal, the alarm will not sound but as the vehicle begins to come out of the corner and the wheels are straightened and the turn signal switch returns to neutral position, the relay R will remain energized and the alarm thus deactivated until such time as the vehicle is again on a straight forward course when the contact 61 opens thus de-energizing the relay R and again placing the alarm system ready for operation.

The turn sensor switch C has been described using a fluid which can move relative to the contacts under the influence of a tilt or centrifugal force. Obviously, other types of tilt sensor switches may be employed within the scope of the invention such as a switch having a pendulum member which carries movable contacts thereon. One of the advantages of mercury is that it tends to be self-damping as it moves through the passages and thus will not oscillate like a pendulum of a clock after it has been subjected to a lateral force.

The principal thing is that the invention provides a warning signal whenever the vehicle exceeds a maximum safe speed around a corner, whether it be leaving a superhighway, rounding a corner in the city or changing lanes on the highway. Furthermore, the invention provides for deactivating the alarm in the event that the driver has indicated that he is aware that he is approaching a turn from a high-speed highway by operating his turn signals. Furthermore, it prevents operation of the alarm when the turn signals are properly operated rounding the corner in the city or changing lanes on a high-speed highway. Additionally, the alarm will not commence to sound when the turn signal actuator returns to the neutral position even though the vehicle is still turning around a corner at a speed in excess of the maximum safe speed.

The invention has been described with reference to a preferred embodiment. Obviously modifications and alterations will occur to others upon reading and understanding of this specification. It is my intention to include all such modifications and alterations insofar as they come within the scope of the appended claims including the use of the invention on towed vehicles as would alert the driver of dangerous tilt or centrifugal whip of the towed vehicle. The invention combined with an automatic counter or recording device can be utilized to monitor the driving habits and patters of the vehicle operator.

Having thus described my invention, I claim:

1. A vehicle turn alarm in combination with a vehicle having a conventional turn signal actuator movable between a normally de-energized condition and an energized condition comprising:
   a turn sensor mounted on said vehicle so as to be responsive to vehicle sidewise tilting and sideward centrifugal forces imposed on the vehicle body; an alarm connected to said sensor in an alarm activation circuit for selective activation when said sensor senses vehicle tilting or sideward centrifugal forces of at least a predetermined permissible upper level; means for selectively deactivating said alarm following activation thereof by said sensor, and means for maintaining said alarm deactivated until abatement of said forces to a level specified hereinbelow, said deactivating and maintaining means being operatively connected to said turn signal actuator so that movement of said actuator from said normally de-energized condition to an energized condition effects deactivation, by operating a relay to open normally closed relay contacts in the alarm activation circuit, and maintains deactivation by closing normally open relay contacts as described hereinbelow,
   other normally open contacts connected to said sensor so as to close upon response of said sensor to vehicle tilting or sideward centrifugal forces of a value substantially less than said predetermined permissible upper level,
   said other normally open contacts being connected through said normally open relay contacts to the coil of the relay in a circuit which, when closed, maintains said relay operated, and
   means to re-open said other normally open contacts upon response of said sensor to abatement of said vehicle tilting or sideward centrifugal forces to a level below said value substantially less than said permissible upper level.

2. The arrangement of claim 1 wherein said sensor comprises a centrifugal tilt switch containing passages partially filled with mercury, and said contacts connected to said sensor include wire leads positioned in said passages above the normal horizontal level of mercury contained therein.

* * * * *